United States Patent
Senda et al.

(10) Patent No.: US 7,491,754 B2
(45) Date of Patent: Feb. 17, 2009

(54) AQUEOUS DISPERSION OF BIODEGRADABLE POLYESTER AND PROCESS FOR PREPARING THE SAME

(75) Inventors: Kenichi Senda, Settsu (JP); Yasuhiro Miki, Settsu (JP)

(73) Assignee: Kaneka Corporation, Osaka (JP)

( * ) Notice: Subject to any disclaimer, the term of this patent is extended or adjusted under 35 U.S.C. 154(b) by 314 days.

(21) Appl. No.: 10/533,381

(22) PCT Filed: Nov. 5, 2003

(86) PCT No.: PCT/JP03/14092

§ 371 (c)(1),
(2), (4) Date: Jun. 2, 2006

(87) PCT Pub. No.: WO2004/041936

PCT Pub. Date: May 21, 2004

(65) Prior Publication Data

US 2006/0258833 A1    Nov. 16, 2006

(51) Int. Cl.
*C08K 5/05* (2006.01)
*C08G 63/60* (2006.01)

(52) U.S. Cl. .................. 523/124; 523/128; 524/599

(58) Field of Classification Search ............... 523/124, 523/128; 524/599
See application file for complete search history.

(56) References Cited

U.S. PATENT DOCUMENTS 5,599,891 A    2/1997  Horowitz et al.

FOREIGN PATENT DOCUMENTS

| EP | 0 809 669 B1 | 4/1999 |
|---|---|---|
| WO | WO 97/07229 | 2/1997 |
| WO | WO 99/64498 | 12/1999 |
| WO | WO 01/30892 A1 | 5/2001 |

*Primary Examiner*—Kriellion A Sanders
(74) *Attorney, Agent, or Firm*—Kenyon & Kenyon LLP

(57) ABSTRACT

The present invention provides an aqueous dispersion of biodegradable polyester, which has excellent film forming properties and provides a resin coating film which is flexible, has favorable elongation and is strong to folding, when applied in coatings, adhesives, fiber processing, sheet film processing and paper processing. More specifically, the present invention provides an aqueous dispersion of biodegradable polyester comprising a copolymer of 3HB and 3HH, which has a flexural modulus of 100 to 1500 MPa and a weight average molecular weight of 50,000 to 3,000,000, wherein the copolymer within the aqueous dispersion has an average particle size of 0.1 to 50 μm.

12 Claims, No Drawings

AQUEOUS DISPERSION OF BIODEGRADABLE POLYESTER AND PROCESS FOR PREPARING THE SAME

This is a 371 national phase application of PCT/JP2003/014092 filed 5 Nov. 2003, claiming priority to Japanese Patent Application No. 2002-325984 filed 8 Nov. 2002, the contents of which are incorporated herein by reference.

TECHNICAL FIELD

The present invention relates to an aqueous dispersion of biodegradable polyester and a process for preparing the same. More specifically, the present invention relates to an aqueous dispersion of biodegradable polyester containing a copolymer (hereafter referred to as PHBH) of 3-hydroxybutyrate (hereinafter referred to as 3HB) and 3-hydroxyhexanoate (hereafter referred to as 3HH) and a process for preparing the same.

BACKGROUND ART

Aqueous dispersion of resin is widely used in coatings, adhesives, fiber processing, sheet or film processing and paper processing and is superior in handling and working environment safety, compared to a solvent solution. Almost all resins in the existing aqueous dispersion are non-biodegradable, with the exception of starch and rubber latex, and there is a problem that the load to the environment is large, in terms of waste treatment.

In recent years, environmental problems caused by waste plastics have been drawing interest and while realization of a recycling society on a global scale is desired, a biodegradable plastic, which is decomposed into water and carbon dioxide after the plastic is used by function of microorganisms, is attracting attention. Sheets, films, fibers and molded articles have already been manufactured both domestically and internationally, but aqueous dispersion of resin referred to as emulsion or latex which are biodegradable are few in number.

For example, an aqueous composition for paper coating containing polylactic acid is prepared by solidifying resin after melting by heat in a solvent and further, stirring together with glass beads at a high speed and then pulverizing, in order to obtain an aqueous dispersion of fine particles (see JP-A-9-78494, paragraph 0008). Also, an aqueous dispersion of aliphatic polyester emulsion is prepared by mixing and kneading melted resin and an aqueous solution of an emulsifier (see. JP-A-11-92712, paragraph 0006, JP-A-2001-354841, paragraph 0006). Also, there is a method of pulverizing frozen resin, but all of the methods require a great deal of labor in order to obtain an aqueous dispersion of fine particles and are economically disadvantageous.

As examples of polyhydroxy alkanoate (hereinafter referred to as PHA) produced from a microorganism, a homopolymer of 3HB (hereinafter referred to as PHB) and a copolymer of 3HB and 3-hydroxy valylate (hereinafter referred to as 3HV) (hereinafter referred to as PHBV) are disclosed. However, these resins have the faults of little elongation and being brittle (see. U.S. Pat. No. 5,451,456, column 4, lines 5 to 23, and JP-A-11-500613, page 7, lines 21 to 22). Consequently, a coating film formed by applying an aqueous dispersion containing such resins also has little elongation and is brittle and when applied to sheet, film or paper, there is the problem of cracks, which occur by folding.

The object of the present invention is to provide an aqueous dispersion of biodegradable polyester, which has excellent film forming properties and provides a resin coating film which is flexible, has favorable elongation and is strong to folding, when applied in coatings, adhesives, fiber processing, sheet film processing and paper processing. Also, the present invention aims to provide a process for easily preparing an aqueous dispersion of fine particles of biodegradable polyester, without solidifying resin after melting by heat in a solvent, without mixing and kneading melted resin and an aqueous solution of an emulsifier or without pulverizing frozen resin.

DISCLOSURE OF INVENTION

That is, the present invention relates to an aqueous dispersion of biodegradable polyester comprising a copolymer of 3HB and 3HH, which has a flexural modulus of 100 to 1500 MPa and a weight average molecular weight of 50,000 to 3,000,000, wherein the copolymer within the aqueous dispersion has an average particle size of 0.1 to 50 μm.

The solid content concentration of the copolymer within the aqueous dispersion is preferably 5 to 70% by weight.

The aqueous dispersion more preferably contains emulsifiers.

Also, the present invention relates to a process for preparing the aqueous dispersion of biodegradable polyester, wherein the copolymer is produced from a microorganism, which comprises a step of isolating the copolymer within the microorganism by disrupting the microorganism containing the copolymer in a dispersed state.

The process preferably includes a step of separating the copolymer particles, which are partially agglomerated, from each other by applying mechanical shearing to the aqueous dispersion.

BEST MODE FOR CARRYING OUT THE INVENTION

The present invention relates to an aqueous dispersion of biodegradable polyester comprising a copolymer of 3HB and 3HH, which has a flexural modulus of 100 to 1500 MPa and a weight average molecular weight of 50,000 to 3,000,000, wherein the copolymer within the aqueous dispersion has an average particle size of 0.1 to 50 μm.

The copolymer can be obtained from either method of producing from a microorganism or chemical synthesis and is not particularly limited. Of these, PHBH produced from a microorganism is preferable from the viewpoint of being fine powder.

The microorganism which produces PHBH is not particularly limited, as long as the microorganism accumulates PHBH within the cell. Examples are *Alcaligenes* such as *A. lipolytica*, *A. eutrophus* and *A. latus*, *Pseudomonas*, *Bacillus*, *Azotobacter*, *Nocardia* and *Aeromonas*. Of these, a strain such as *Aeromonas caviae* and also *Alcaligenes eutrophus* AC32, in which PHA synthetic enzyme genes are introduced (accession number FERM BP-6038 (transferred from original deposit (FERM P-15786) deposited on Aug. 12, 1996) (Aug. 7, 1997, International Patent Organism Depositary, National Institute of Advanced Industrial Science and Technology, address: AIST Tsukuba Central 6, 1-1, Higashi 1-Chome, Tsukuba-shi, Ibaraki-ken 305-8566 Japan)) (J. Bacteriol., 179, pages 4821 to 4830 (1997)) are preferable in view of productivity of PHBH. The method for obtaining PHBH from *Aeromonas caviae* is disclosed for example in JP-A-5-93049. These microorganisms are cultured under suitable conditions to accumulate PHBH in the microorganism.

With respect to the carbon source used for culturing and the culturing conditions, the method described in JP-A-5-93049 and JP-A-2001-340078 may be used but are not limited thereto.

The composition ratio of PHBH is preferably 3HB/3HH=97 to 75/3 to 25 (% by mole), more preferably 3HB/3HH=95 to 85/5 to 15 (% by mole). When the composition of 3HH is less than 3% by mole, the properties of PHBH become closer to the properties of a 3HB homopolymer and tend to be unpreferable, as not only is flexibility lost but also the processing temperature for forming film becomes too high. When the composition of 3HH is more than 25% by mole, the crystallization rate becomes too slow, becoming unsuitable for film forming processing. Also, because the crystallinity degree decreases, the resin becomes flexible and flexural modulus tends to decrease. The composition of 3HH was measured by NMR analysis of the powder obtained by centrifuging and then drying the aqueous dispersion.

The PHBH produced from a microorganism obtained in this manner is a random copolymer. In order to adjust the composition of 3HH, the methods of selecting a microorganism, selecting the carbon source which is to be the raw ingredient, blending PHBH with a different 3HH composition and blending a 3HB homopolymer can be employed.

In order to obtain a coating film having flexible properties from the aqueous dispersion of the present invention, the flexural modulus of PHBH is 100 to 1500 MPa, preferably 200 to 1300 MPa, more preferably 200 to 1000 MPa. A flexural modulus of less than 100 MPa is not too soft, but in relation with the 3HH composition, crystallization becomes slow. When the flexural modulus is more than 1500 MPa, the rigidity of the resin becomes high and the coating film of PHBH when processing becomes too hard. Herein, the value of the flexural modulus is the value obtained by measuring according to JIS K7171 a press sheet prepared from the PHBH powder obtained from the aqueous dispersion The weight average molecular weight (hereinafter referred to as Mw) of PHBH is 50,000 to 3,000,000, more preferably 100,000 to 2,000,000. When Mw is less than 50,000, the coating film formed from the aqueous dispersion containing PHBH becomes too brittle and unsuitable for practical use. When Mw is more than 3,000,000, the viscosity of the aqueous dispersion containing PHBH becomes too high that processing such as coating becomes difficult and also, voids develop in the formed film, making the film defective. Mw is the value measured from the molecular weight distribution converted to polystyrene by the method applying the powder, obtained by centrifuging and then drying the aqueous dispersion containing PHBH, to gel permeation chromatography (GPC) using chloroform as the eluent.

The average particle size of the PHBH within the aqueous dispersion of the present invention is 0.1 to 50 μm, more preferably 0.5 to 10 μm. An average particle size of less than 0.1 μm is difficult to obtain when PHBH is produced from a microorganism and even when PHBH is obtained from chemical synthesis, a step for making into fine particles becomes necessary. When the average particle size is more than 50 μm, in the case that the aqueous dispersion containing PHBH is coated, unevenness in coating occurs on the surface. The average particle size of PHBH is the particle size, which corresponds with the cumulative amount of 50% of all particles in a normal distribution, which is measured from a water suspension of PHBH adjusted to a specific concentration, using a conventional particle size meter such as a Microtrac particle size analyzer (made by Nikkiso Co., Ltd., FRA).

The solid content concentration of PHBH within the aqueous dispersion is preferably 5 to 70% by weight, more preferably 10 to 50% by weight. When the solid content concentration is less than 5% by weight, forming a coating film tends to be difficult. When the solid content concentration is more than 70% by weight, the viscosity of the aqueous dispersion becomes too high and coating tends to become difficult.

The aqueous dispersion of the present invention is relatively stable even though an emulsion is not added, as the particle size of the polymer is small, but in order to stabilize the dispersion further, including an emulsifier is preferable. Examples of the emulsifier are anionic surfactants such as sodium lauryl sulfate and sodium oleate, cationic surfactants such as lauryl trimethyl ammonium chloride, nonionic surfactants such as glycerin fatty acid ester and sorbitan fatty acid ester and water soluble polymers such as polyvinyl alcohol and polyvinyl pyrrolidone. The amount of the emulsifier is preferably 1 to 10% by weight based on the solid content of PHBH. When the amount of the emulsifier is less than 1% by weight, the stabilizing effect by the emulsifier may not be exhibited. When the amount is more than 10% by weight, the amount of the emulsifier mixed into the polymer increases and decrease in properties and coloring tend to be caused. After disrupting and alkali treatment of the microorganism, the emulsifier can be added to the aqueous dispersion after centrifugation and washing with water. When conducting washing with methanol, the emulsifier can be added before or after the solid content concentration is adjusted by adding a suitable amount of water, after washing with methanol.

To the aqueous dispersion of the present invention, if required, pigment, plasticizer, tackifier, filler and chemicals can be added.

The process for preparing the aqueous dispersion of biodegradable polyester of the present invention preferably includes a step of isolating the PHBH within a microorganism by disrupting the microorganism in an aqueous dispersed state. In the case of the method of dissolving PHBH using an organic solvent such as chloroform and recovering PHBH by precipitation using a solvent in which PHBH is insoluble such as methanol and hexane, the obtained PHBH does not become fine particles and a step for making the PHBH into fine particles is necessary, becoming economically disadvantageous. By the preparation process of the present invention, an aqueous dispersion of fine particles is obtained, in which the fine particle size of PHBH produced within the microorganism is maintained considerably.

In the step of isolating the PHBH within the microorganism by disrupting the microorganism containing PHBH in an aqueous dispersed state, disrupting and adding alkali are preferably conducted simultaneously, while stirring the microorganism containing PHBH. The advantages of this method are that increase in viscosity of the dispersion, due to structural components of the microorganism other than PHBH leaking from the microorganism, can be prevented and that by preventing increase in viscosity of the microorganism dispersion, the pH can be controlled and furthermore, by adding alkali continuously or intermittently, treatment with a low alkali concentration becomes possible. Another advantage is that decrease in molecular weight of PHBH can be reduced and therefore highly pure PHBH can be isolated. The pH of the microorganism dispersion after adding alkali is preferably 9 to 13.5. When the pH is lower than 9, isolating PHBH from the microorganism tends to be difficult. When the pH is more than 13.5, decomposition of PHBH tends to become intense.

For disrupting the microorganism, there are the methods of disrupting with ultrasonic waves and methods using an emulsifying disperser, a high-pressure homogenizer or a mill. Of these, from the viewpoint that by alkali treatment, PHBH is eluted from within the microorganism and nucleic acid, which is the main cause of increase in viscosity, is efficiently disrupted and as a result, insoluble substances other than the polymer, such as cell wall, cell membrane and insoluble protein, are sufficiently dispersed, an emulsifying disperser such as a Silverson mixer (made by Silverson Machines Limited), a clear mix (made by M-tech) and an Ebara milder (made by Ebara Co., Ltd.) is preferably used, but not limited thereto. The preferable temperature condition for disrupting the microorganism and adding alkali is the range of room temperature to 50° C. When the temperature condition is higher than 50° C., decomposition of the PHBH polymer tends to occur easily and so a temperature close to room temperature is preferable. Adjusting the temperature to lower than room temperature is uneconomical, as a step for cooling becomes necessary.

From the dispersion obtained by disrupting and alkali treatment of the microorganism, precipitate is obtained by centrifugation. This precipitate is washed with water, or washed with methanol when necessary, and then a suitable amount of water is added thereto, to obtain an aqueous dispersion of PHBH with the desired solid content concentration.

In the present invention, after the above step, the step of separating the partially agglomerated PHBH particles from each other by applying mechanical shearing to the aqueous dispersion is preferably included. Applying mechanical shearing is preferable from the viewpoint that agglomerates are lost and an aqueous dispersion of polymers with an even particle size can be obtained. Mechanical shearing of the aqueous dispersion can be conducted using a stirrer, homogenizer or ultrasonic waves. At this point, agglomeration of the polymer particles is not all that strong and so mechanical shearing is preferably conducted using a stirrer with the usual stirring blades, in view of simplicity.

Hereinafter, the present invention is described in detail by means of Examples and Comparative Examples.

EXAMPLE 1

The microorganism used in the present Example is *Alcaligenes eutrophus* AC32, in which PHA synthetic enzyme genes derived from *Aeromonas caviae* are introduced (accession number FERM BP-6038 (transferred from original deposit (FERM P-15786) deposited on Aug. 12, 1996) (Aug. 7, 1997, International Patent Organism Depositary, National Institute of Advanced Industrial Science and Technology, address: AIST Tsukuba Central 6, 1-1, Higashi 1-Chome, Tsukuba-shi, Ibaraki-ken 305-8566 Japan)). The microorganism was cultured by the method described in J. Bacteriol., 179, pages 4821 to 4830 (1997) using palm oil as the carbon source. Culture was conducted in a 3 L jar equipped with a stirrer at 35° C. at a stirring rate of 500 rpm for a culturing time of 60 hours and a microorganism containing approximately 60% by weight of PHBH with a Mw of 1,000,000 was obtained. Next, by conducting centrifugation (5,000 rpm, 10 minutes) of the culture solution, microorganism in the form of paste was obtained and water was added thereto to obtain an aqueous dispersion of 50 g of microorganism/L.

A 1 L container equipped with a stirrer was charged with 500 ml of the microorganism aqueous dispersion and the temperature was maintained at 35° C. with stirring. While adding an aqueous solution of sodium hydroxide to the aqueous dispersion which is being stirred so that the pH of the microorganism dispersion was maintained at 1.8, the emulsifying disperser attached to the container was activated. The dispersion was stirred for 2 hours and the microorganism was disrupted. The microorganism dispersion after treatment was centrifuged to obtain precipitate. The precipitate was washed once with water and twice with methanol and a suitable amount of water was added to obtain an aqueous dispersion in which the solid content concentration of PHBH was 20% by weight. The average particle size of PHBH within this aqueous dispersion was 1.17 μm. With respect to the powder obtained by drying this aqueous dispersion under reduced pressure, the 3HH composition was 6% by mole and the Mw was 870,000.

Also, the flexural modulus of a press sheet prepared from the powder obtained by drying the obtained aqueous dispersion of PHBH after centrifuging was measured according to JIS K7171. The flexural modulus was 1200 MPa.

10 g of the obtained aqueous dispersion of PHBH was poured on a clean glass surface and then dried in a dryer at 120 to 200° C. for 10 to 30 minutes. The produced coating film was peeled from the glass surface and a film with a thickness of 50 to 60 μm was obtained. The tensile elongation at break of this film was measured according to JIS K7127. Also, cracks in the folded area, when the film was folded, were observed. Film in which cracks were not found was evaluated as ○, film with some cracks was evaluated as Δ and film with cracks in most of the folded area was evaluated as x. The biodegradability was examined by immersing the coating film in active sludge. The results are shown in Table 1. The elongation at break of the coating film was 100%.

EXAMPLE 2

Culture was conducted in the same manner as in Example 1 except that coconut oil was used as the carbon source and an aqueous dispersion with a solid content concentration of 20% by weight was obtained. The average particle size of PHBH within this aqueous dispersion was 1.69 μm. With respect to the powder obtained by drying this aqueous dispersion under reduced pressure, the 3HH composition was 10% by mole and the Mw was 760,000. Also, in the same manner as in Example 1, the flexural modulus and elongation at break of the coating film were measured and cracks in the folded area and biodegradability of the film were observed. The flexural modulus was 500 MPa. The elongation at break of the coating film was 400%. The results are shown in Table 1.

EXAMPLE 3

Culture was conducted in the same manner as in Example 1 except that coconut oil was used as the carbon source and the culturing temperature was 30° C. and an aqueous dispersion with a solid content concentration of 20% by weight was obtained. The average particle size of PHBH within this aqueous dispersion was 1.95 μm. With respect to the powder obtained by drying this aqueous dispersion under reduced pressure, the 3HH composition was 15% by mole and the Mw was 960,000. Also, in the same manner as in Example 1, the flexural modulus and elongation at break of the coating film were measured and cracks in the folded area and biodegradability of the film were observed. The flexural modulus was 300 MPa. The elongation at break of the coating film was 760%. The results are shown in Table 1.

EXAMPLE 4

3 parts by weight of partially hydrolyzed polyvinyl alcohol (available from Kuraray Co., Ltd., Kuraray Poval PVA205) was added as an emulsifier to the aqueous dispersion with a solid content concentration of 20% by weight of Example 1.

Stirring was conducted for 30 minutes with a stirrer and an aqueous dispersion containing an emulsifier was obtained. The aqueous dispersion of both Example 1 and the present Example were left for three months at room temperature and the stability when left was compared. In the aqueous dispersion of Example 1, a slight amount of precipitate was found but in the aqueous dispersion of the present Example, precipitate was not found and the dispersion remained unchanged.

EXAMPLE 5

A 1 L container equipped with a stirrer was charged with the aqueous dispersion obtained in Example 3 and stirring was conducted at a stirring rate of 500 rpm for 1 hour. The average particle size of PHBH within the obtained aqueous dispersion was 1.02 μm and was finer than the original average particle size of 1.95 μm.

COMPARATIVE EXAMPLE 1

An aqueous dispersion of PHB with a solid content concentration of 20% by weight was obtained in the same manner as in Example 1, except that butyric acid was used as the carbon source and the culturing temperature was 30° C. The average particle size of PHB within this aqueous dispersion was 1.12 μm. With respect to the powder obtained by drying this aqueous dispersion under reduced pressure, the Mw was 600,000. Also, in the same manner as in Example 1, the flexural modulus and elongation at break of the coating film were measured and cracks in the folded area and biodegradability of the film were observed. The flexural modulus was 2600 MPa. The elongation at break of the coating film was 8%. The results are shown in Table 1.

COMPARATIVE EXAMPLE 2

An aqueous dispersion of PHBV with a solid content concentration of 20% by weight was obtained in the same manner as in Example 1, except that a carbon source, in which the compounding ratio of butyric acid and valeric acid was butyric acid/valeric acid=92/8, was used and the culturing temperature was 30° C. The average particle size of PHBV within this aqueous dispersion was 1.35 μm. With respect to the powder obtained by drying this aqueous dispersion under reduced pressure, the Mw was 590,000 and the 3HV composition was 10% by mole. Also, in the same manner as in Example 1, the flexural modulus and elongation at break of the coating film were measured and cracks in the folded area and biodegradability of the film were observed. The flexural modulus was 1800 MPa. The elongation at break of the coating film was 20%. The results are shown in Table 1.

COMPARATIVE EXAMPLE 3

An aqueous dispersion of PHBV with a solid content concentration of 20% by weight was obtained in the same manner as in Example 1, except that a carbon source, in which the compounding ratio of butyric acid and valeric acid was butyric acid/valeric acid=83/17, was used and the culturing temperature was 30° C. The average particle size of PHBV within this aqueous dispersion was 1.54 μm. With respect to the powder obtained by drying this aqueous dispersion under reduced pressure, the Mw was 570,000 and the 3HV composition was 20% by mole. Also, in the same manner as in Example 1, the flexural modulus and elongation at break of the coating film were measured and cracks in the folded area and biodegradability of the film were observed. The flexural modulus was 1600 MPa. The elongation at break of the coating film was 50%. The results are shown in Table 1.

TABLE 1

| Biodegradable Polyester | Ex. 1 PHBH | Ex. 2 PHBH | Ex. 3 PHBH | Com. Ex. 1 PHB | Com. Ex. 2 PHBV | Com. Ex. 3 PHBV |
|---|---|---|---|---|---|---|
| 3HH Composition (% by mole) | 6 | 10 | 15 | 0 | — | — |
| 3HV Composition (% by mole) | — | — | — | 0 | 10 | 20 |
| 3HB Composition (% by mole) | 94 | 90 | 85 | 100 | 90 | 80 |
| Flexural Modulus of Resin (MPa) | 1200 | 500 | 300 | 2600 | 1800 | 1600 |
| Elongation at Break of Coating Film (%) | 100 | 400 | 760 | 8 | 20 | 50 |
| Cracks in Folded Area of Coating Film | Δ | ○ | ○ | X | X | X |
| Biodegradability (within active sludge) | Decomposed in 2 to 3 weeks | | | Decomposed in 4 to 6 weeks | | |

The coating film obtained from an aqueous dispersion containing PHBH was flexible and had favorable elongation. Also, when the film was folded, cracks rarely developed in the folded area.

In the case of PHB and PHBV, 4 to 6 weeks were required to completely decompose but in the case of PHBH, the decomposition time was 2 to 3 weeks and reduced significantly. The coating films of Examples 1 to 3 and Comparative Examples 1 to 3 were all favorable in biodegradability, but film using PHBH was easier to decompose.

INDUSTRIAL APPLICABILITY

As described above, the aqueous dispersion of biodegradable polyester containing PHBH of the present invention has excellent film forming properties and provides a resin coating film which is flexible, has favorable elongation and is strong to folding, when applied in coatings, adhesives, fiber processing, sheet film processing and paper processing. Furthermore, in the case that PHBH produced from a microorganism is used, an aqueous dispersion of fine particles can easily be obtained from the method of isolating PHBH by disrupting the microorganism in which PHBH is accumulated in an aqueous system, without solidifying PHBH after melting by heat in a solvent, without mixing and kneading melted resin and an aqueous solution of an emulsifier or without pulverizing frozen resin.

What is claimed is:

1. An aqueous dispersion of biodegradable polyester comprising a copolymer comprising 97% to 75% by mole of 3-hydroxybutyrate and 3% to 25% by mole of 3-hydroxyhexanoate, which has a flexural modulus of 100 to 1500 MPa and a weight average molecular weight of 50,000 to 3,000,000, wherein said copolymer within said aqueous dispersion has an average particle size of 0.1 to 50 μm.

2. The aqueous dispersion of biodegradable polyester of claim 1, wherein solid content concentration of said copolymer within said aqueous dispersion is 5 to 70% by weight.

3. The aqueous dispersion of biodegradable polyester of claim 1, wherein said aqueous dispersion contains an emulsifier.

4. A process for preparing the aqueous dispersion of biodegradable polyester of claim 1, wherein said copolymer is produced from a microorganism, which comprises a step of isolating said copolymer within said microorganism by disrupting said microorganism containing said copolymer in an aqueous dispersed state.

5. The process for preparing the aqueous dispersion of biodegradable polyester of claim 4, which comprises a step of separating said copolymer particles, which are partially agglomerated, from each other by applying mechanical shearing to said aqueous dispersion.

6. The aqueous dispersion of biodegradable polyester of claim 2, wherein said aqueous dispersion contains an emulsifier.

7. A process for preparing the aqueous dispersion of biodegradable polyester of claim 2, wherein said copolymer is produced from a microorganism,
which comprises a step of isolating said copolymer within said microorganism by disrupting said microorganism containing said copolymer in an aqueous dispersed state.

8. A process for preparing the aqueous dispersion of biodegradable polyester of claim 3, wherein said copolymer is produced from a microorganism,
which comprises a step of isolating said copolymer within said microorganism by disrupting said microorganism containing said copolymer in an aqueous dispersed state.

9. A process for preparing the aqueous dispersion of biodegradable polyester of claim 6, wherein said copolymer is produced from a microorganism,
which comprises a step of isolating said copolymer within said microorganism by disrupting said microorganism containing said copolymer in an aqueous dispersed state.

10. The process for preparing the aqueous dispersion of biodegradable polyester of claim 7, which comprises a step of separating said copolymer particles, which are partially agglomerated, from each other by applying mechanical shearing to said aqueous dispersion.

11. The process for preparing the aqueous dispersion of biodegradable polyester of claim 8, which comprises a step of separating said copolymer particles, which are partially agglomerated, from each other by applying mechanical shearing to said aqueous dispersion.

12. The process for preparing the aqueous dispersion of biodegradable polyester of claim 9, which comprises a step of separating said copolymer particles, which are partially agglomerated, from each other by applying mechanical shearing to said aqueous dispersion.

\* \* \* \* \*